(12) United States Patent
Ueda et al.

(10) Patent No.: US 6,214,099 B1
(45) Date of Patent: *Apr. 10, 2001

(54) LIQUID COMPOSITION AND INK SET, AND AN IMAGE FORMING METHOD USING SAID COMPOSITION AND SET

(75) Inventors: Takamasa Ueda; Kenichi Tabata, both of Ibaraki; Noboru Ueda, Kyoto; Hideo Hotomi, Nishinomiya, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,767

(22) Filed: Mar. 12, 1999

(30) Foreign Application Priority Data

Mar. 31, 1998 (JP) .................................................. 10-085862

(51) Int. Cl.$^7$ ...................................................... C09D 11/02
(52) U.S. Cl. .................................... 106/31.57; 106/31.58; 106/31.85; 106/31.86
(58) Field of Search .............................. 106/31.57, 31.58, 106/31.85, 31.86

(56) References Cited

U.S. PATENT DOCUMENTS

| | | | |
|---|---|---|---|
| 5,614,007 | * 3/1997 | Kurabayashi et al. | ............ 106/31.27 |
| 5,618,338 | 4/1997 | Kurabayashi . | |
| 5,700,314 | * 12/1997 | Kurbayashi et al. | ............. 106/31.27 |

\* cited by examiner

*Primary Examiner*—Helene Klemanski
*Assistant Examiner*—Veronica F. Faison
(74) *Attorney, Agent, or Firm*—McDermott, Will & Emery

(57) ABSTRACT

A liquid composition according to the present invention includes an organic solvent having a vapor pressure of 30 to 60 mmHg at 20° C. and water, wherein a weight ratio of the organic solvent and the water is between 95:5 to 45:55. The invention further provides an ink set which comprises the liquid composition and an ink, and an image forming method which employ the liquid composition and the ink.

20 Claims, No Drawings

LIQUID COMPOSITION AND INK SET, AND AN IMAGE FORMING METHOD USING SAID COMPOSITION AND SET

RELATED APPLICATIONS

The present invention is based on Japanese Patent Application No. 10-85862, each content of which being incorporated by reference.

BACKGROUND OF THE INVENTION

1 Field of the Invention

The present invention pertains to a liquid composition that is suited for use in image formation using the inkjet recording method, an ink set combining the liquid composition and ink, and an image forming method using said liquid composition and ink set.

2 Description of the Related Art

An inkjet recording method refers to a method in which droplets of ink are expelled from small holes such that the ink will adhere to a recording medium consisting of paper, for example. For the ink used in this method, ink comprising various different coloring agents dissolved or dispersed in water or a medium comprising water and various organic solvents are generally known. Ink of various colors, i.e., yellow, cyan, magenta, black, red, blue and green, is commercially available for the reproduction of color images.

Ink used for inkjet recording is required to dry quickly in order to achieve fast recording (15 ppm or more) and printing on regular paper. In an attempt to provide ink that dries quickly, organic solvents that have a relatively high volatility have been used to improve the drying property.

However, because the inkjet method involves expulsion of ink droplets from small holes, the problem arises that the holes become clogged with dried ink. Because the improvement of the drying property and the prevention of clogging are opposing objectives, a balance between the two is currently achieved by means of a maintenance mechanism to prevent the ink from drying, but given the increasing demand for faster printing speeds, achieving these two objectives to an equal extent has become an important task.

On the other hand, U.S. Pat. No. 5,618,338, for example, proposes a technology to cause a liquid composition containing a specific substance to adhere to the image formation area, in addition to the ink, from the viewpoint of improving the quality of the recorded images, but this technology is not capable of completely achieving the two objectives described above. In addition, said patent makes no mention the balanced achievement of these objectives.

OBJECT AND SUMMARY

The present invention was made in consideration of the situation described above. Its object is to provide a liquid composition, an ink set and an image forming method that improve the drying property of the ink and prevent the clogging of the holes from which the ink is expelled.

The present invention relates to a liquid composition that is used in an image forming method that includes a step in which the liquid composition is caused to attach to an image formation area of the recording medium and a step in which the ink is provided to the recording medium by means of the inkjet recording method, s aid liquid composition including an organic solvent having a vapor pressure of 30 to 60 mmHg at 20° C. and water, wherein the ratio by weight of the organic solvent to the water (organic solvent/water) is between 95/5 and 45/55.

The present invention also relates to an ink set comprising the liquid composition and ink of at least one color.

The present invention also relates to an image forming method including a step in which the liquid composition is caused to attach to an image formation area of the recording medium and a step in which the ink is provided to the recording medium by means of the inkjet recording method.

DESCRIPTION OF THE PREFERRED EMBODIMENTS

The inventors of the present invention discovered that, with regard to a liquid composition that is used in an image forming method that includes a step in which the liquid composition is caused to attach to at least an image formation area of the recording medium and a step in which the ink is provided to the recording medium by means of the inkjet recording method, if a mixed solution including a highly volatile organic solvent and water is used as the composition, the improvement of the ink's drying property and the prevention of clogging of the nozzles may be easily achieved.

The liquid composition pertaining to the present invention comprises a liquid composition including at minimum a highly volatile organic solvent and water. For the highly volatile organic solvent, any water-soluble organic solvent having a vapor pressure of 30 to 60 mmHg, may be used without any specific limitations. For example, the solvent may comprise a lower alcohol, such as ethanol or isopropyl alcohol. If an organic solvent having a vapor pressure of less than 30 mmHg at 20° C. were used, the quick drying characteristic could not be obtained in the ink, which would create a problem. Further, if an organic solvent having a vapor pressure of over 60 mmHg were used, although the effects of the present invention, i.e., improved quick drying property of the ink and prevention of clogging of the nozzles, would be obtained, the liquid composition would dry too quickly and it would become necessary to keep it airtight inside the image forming apparatus, which would not be preferred.

The ratio by weight of the organic solvent to water (organic solvent/water) in the liquid composition pertaining to the present invention should preferably be between 95/5 and 45/55, although this range may vary depending on the type of the organic solvent used. If the ratio by weight of the organic solvent is smaller than said range in the mixture solution, it becomes difficult to obtain the quick drying property for the ink, and if said range is exceeded, the handling of the liquid composition inside the image forming apparatus may become difficult.

The liquid composition pertaining to the present invention may include a viscosity adjusting agent, a pH adjusting agent, a preservative, various surfactants, an antioxidant and an evaporation promoting agent. The additives should be 1% or less by weight.

The liquid composition may be easily obtained by simply mixing the ingredients listed above. It is preferred that the liquid composition be filtered under pressure using a membrane filter having a pore size of 0.1 μm through 1.0 μm (Fluoro Porefilter by Sumitomo Electric Industries, Ltd., for example) after the ingredients are mixed together.

The ink set pertaining to the present invention comprises the liquid composition described above and ink of at least one color selected from the group of color inks, i.e., yellow, magenta, cyan, black, red, blue and green.

The ink used in the present invention comprises at minimum a coloring agent and water, said coloring agent being dissolved or dispersed in the water. It is also acceptable if a moisture retaining agent, a viscosity adjusting agent, a pH adjusting agent, a preservative, various surfactants and an antioxidant are included where necessary. In the ink used in the present invention, a small amount of a water-soluble organic solvent may be included so that the additives will be efficiently dissolved in the water. The ink used in the present invention is explained in detail below.

The coloring agent used may comprise a dye or a pigment. As specific examples, for the yellow coloring agent used in the ink, where a dye is used, C.I. Direct Yellow 86, C.I. Acid Yellow 23 or C.I. Acid Yellow 79 may be used, and where a pigment is used, C.I. Pigment Yellow 1, C.I. Pigment Yellow 2, C.I. Pigment Yellow 3, C.I. Pigment Yellow 13, C.I. Pigment Yellow 16 or C.I. Pigment Yellow 83 may be used. But the coloring agent is not limited to these.

For the magenta coloring agent, where a dye is used, such substances as C.I. Acid Red 289, C.I. Acid Red 52 or C.I. Reactive Red 120 may be used, and where a pigment is used, such substances as C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112 or C.I. Pigment Red 122 may be used. But the coloring agent is not limited to these.

For the cyan coloring agent, where a dye is used, such substances as C.I. Direct Blue 86, C.I. Direct Blue 199 or C.I. Acid Blue 9 may be used, and where a pigment is used, such substances as C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 or C.I. Vat Blue 6 may be used. But the coloring agent is not limited to these.

For the black coloring agent, where a dye is used, C.I. Food Black 1 or C.I. Food Black 2 may be used, and where a pigment is used, carbon black in particular is used for black ink. A carbon black that was manufactured by means of the furnace method or the channel method and that has an average primary particle size of 15 to 40 nm, BET surface area of 50 to 300 m$^2$/g, DBP oil absorption of 40 to 150 ml/100 g and volatility of 0.5 to 10%, as well as a pH of 2 to 9, is preferred. Commercially available products having such properties include, for example, No. 2300, No. 900, MCF88, No. 33, No. 40, No. 45, No. 52, MA7, MA8 and No. 2200B (made by Mitsubishi Kagaku), RAVEN 1255 (made by Columbia), REGAL 250R, REGAL 400R, REGAL 330R, REGAL 660R and MOGUL L (made by Cabot), as well as Color Black FW1, Color Black FW18, Color Black S170, Color Black S150, Printex 35 and Printex U (made by Degussa). Any of these may be used, but the black coloring agent is not limited to these.

The coloring agent comprises 5% to 10% by weight relative to the total weight of the ink. Because the concentration of the coloring agent of the ink used in the present invention is set to be higher than that in conventional ink, the ink can achieve a prescribed level of print darkness using a relatively small expelled amount in the present invention. If the concentration of the coloring agent were set to be as high in a conventional ink as in the present invention, and if a quick drying solvent were contained from the viewpoint of securing a quick drying property, clogging of the openings in the head would immediately result. Two or more coloring agents may be mixed and used. In that case, they should be contained in the ink such that their total amount is within the range mentioned above. If the coloring agent comprises less than 5% by weight, the desired level of image darkness is not obtained, and if it comprises more than 10% by weight, clogging of the ink nozzles easily takes place.

Where a pigment is used for the coloring agent, it is preferred that the pigment have an average primary particle diameter between 0.01 and 1.0 $\mu$m, and more preferably, between 0.05 and 0.1 $\mu$m, so that the pigment may be efficiently dispersed in the water.

For the moisture retaining agent used in the ink employed in the present invention where desired, there are no particular limitations so long as the moisture retaining agent comprises a substance that is conventionally mixed in ink for the same purpose. A low-volatility water-soluble organic solvent may be effectively used. Specifically, diethylene glycol, glycerin or triethylen glycol monobutyl ether may be used. Among these, it is further preferred that an organic solvent having a vapor pressure at 20° C. is 1 mmHg or lower be used. It is preferred that the moisture retaining agent comprise 5% to 40% by weight, and more preferably 10% to 30% by weight, relative to the total weight of the ink. It is acceptable if two or more organic solvents are used as the moisture retaining agent. In that case, their total amount should be within the range described above.

Ink that contains a dye as the coloring agent may be prepared by mixing the desired ingredients including a dye in water and then filtering under pressure the mixture solution using a membrane filter having a 0.1 to 1.0 $\mu$m pore size (Fluoro Porefilter by Sumitomo Electric Industries, for example). It is preferred that the ink be adjusted by means of triethanol amine, NaHCO$_3$ or NaOH, for example, so that it will have a pH of 8 to 10, maintaining slight alkalinity. In addition, a resin may be added for the purpose of increasing the fixing property of the ink. For the resin, polyvinyl alcohol, sodium alginate or styrene-maleic acid copolymer may be used. The resin should comprise 1% to 5% by weight of the total weight of the ink.

Ink that contains a pigment as the coloring agent may be prepared using any method so long as the pigment may be dispersed uniformly in the water medium. A method described below that uses a dispersing agent may be used, for example. First, a dispersing agent is mixed in water containing a moisture retaining agent and the mixture solution is heated in a water bath to 50 to 70° C. so that the dispersing agent may be completely dissolved. When this is done, it is preferred that a base be added in order to promote the dissolution of the dispersing agent. A pigment is then added to the solution thereby obtained. After pre-mixing the mixture solution for half an hour or longer, the pigment is dispersed to a sufficient degree using a dispersing device such as Sand Grinder (by Igarashi Kikai) to obtain a dispersion solution. By further mixing into the solution water containing a moisture retaining agent, etc., ink containing a pigment is obtained. It is also preferred that the dispersion solution be centrifuged in order to remove large particles.

For the dispersing agent, any water-soluble resin may be used. A public-domain resin that is generally used as a dispersing agent and that has an average molecular weight between 1,000 and 30,000 is preferred. A public-domain resin that has an average molecular weight between 3,000 and 15,000 is even more preferred. Specifically, such a resin comprises styrene, a styrene derivative, vinyl naphtalyn, a vinyl naphtalyn derivative, or aliphatic alcohol ester of an α, β-ethylene unsaturated carboxylic acid, or a copolymer comprising two or more monomers selected from acrylic acid, a derivative of acrylic acid, maleic acid, a derivative of maleic acid, itaconic acid, a derivative of itaconic acid, fumaric acid, a derivative of fumaric acid, vinyl acetate, vinyl pyrolidone, acrylic amide and a derivative of acrylic amide. At least one monomer should be water-soluble. The dispersing agent should preferably comprise 0.5% to 10% of the total weight of the ink.

For the base that promotes the dissolution of the dispersing agent in the water, an organic amine such as monoethanol amine, diethanol amine, triethanol amine, aminemethylpropanol or ammonia, or an inorganic base such as potassium hydroxide or sodium hydroxide is preferred. It is preferred that the base comprise 3% to 10% of the total weight of the ink.

The image forming method pertaining to the present invention will now be explained. The image forming method of the present invention uses the ink set described above, i.e., the liquid composition and ink, and more particularly, includes a step in which the liquid composition is caused to attach to an image formation area of a recording medium and a step in which the ink is provided to the recording medium by means of the inkjet recording method. The image formation area referred to in the present invention means the area to which the ink dots adhere.

In the image forming method of the present invention, the liquid composition and ink pertaining to the present invention should coexist on the recording medium. It does not matter which is provided to the recording medium first, the liquid composition or the ink, to achieve this goal. Where the liquid composition is provided first, it is preferred, in consideration of the quick drying property of the composition, that the ink be caused to adhere to the recording medium immediately after the adhesion of the composition, preferably within one second.

There are no particular limitations regarding the recording medium to which the liquid composition and the ink of the present invention adhere. So-called regular paper such as copy paper or bond paper, which have conventionally been used, are acceptable. Coated paper that is specially prepared for the purpose of inkjet recording or an OHP transparency may also be used. Moreover, generally available high-quality paper or glossy paper may also be suitably used.

For the method by which the liquid composition is made to adhere to the recording medium, possible methods include a method in which the liquid composition is made to adhere to the entire surface of the recording medium by means of spraying or a roller, but it is preferred that the adhesion be attained using the inkjet recording method capable of causing the liquid composition to selectively adhere only to the image formation area to which the ink adheres or to its vicinity. The ink is provided to the image formation area of the recording medium by means of the inkjet recording method.

In this application, the term 'inkjet recording method' refers to the conventional public-domain recording method by which recording is performed through the expulsion from small holes of liquid droplets that are to adhere to the recording medium, so that the liquid will adhere to the recording medium. For the means to expel droplets from small holes in the present invention, any means may be used so long as droplets can be expelled from small holes, but the expulsion of droplets using air bubbles created by means of thermal energy or using vibration elements is preferred.

One embodiment of the image forming method pertaining to the present invention will be explained. In this embodiment, (a) ink is provided to the image formation area of the recording medium by means of a droplet expulsion means using the inkjet recording method, (b) the liquid composition is provided to the image formation area by another expulsion means similar to that used for the ink such that the liquid composition will be consequently expelled onto the ink, and (c) the ink and the liquid composition are mixed.

In the present invention, because the ink and the liquid composition are used during inkjet recording and they are mixed on the image formation area of the recording medium as described above, the clogging of the nozzles that has to this point been a problem, i.e., the clogging of the nozzles that occurs when a highly volatile organic solvent is used in the ink, is prevented, and the quick drying property of the ink may be secured. Since the ink of the present invention contains only a small amount of highly volatile organic solvent, the ink does not have a quick drying property on its own, but because it is mixed on the recording medium with the liquid composition of the present invention containing a highly volatile organic solvent, as the highly volatile organic solvent evaporates in the mixture solution, other media in the mixture solution also evaporate, giving the ink a quick drying property. If the order of expulsion of the ink and the liquid composition is reversed, the same effect can be obtained in the present invention. In addition, through the present invention, images that are superior in terms of image darkness, character (letter) quality, bleeding and water resistance may be easily provided.

As explained above, the liquid composition, ink set and image forming method of the present invention can easily accommodate increased printing speeds. Specifically, they can achieve high-speed printing producing 15 pages or more per minute when A4 size paper is fed in the vertical orientation.

The present invention will be explained in further detail using the following embodiments.

(Manufacture of a Liquid Composition X)

After mixing and dissolving the following ingredients, the mixture solution was filtered under pressure using a membrane filter having a 0.22 μm pore size (Fluoro Porefilter by Sumitomo Electric Industries) to obtain a liquid composition X.

| Ingredients | |
| --- | --- |
| Methanol (vapor pressure: 92–98 mmHg/20° C.) | 50 parts |
| Distilled water | 50 parts |

(Manufacture of a Liquid Composition Y)

Other than that the following ingredients were used, a liquid composition Y was obtained using the same manufacturing method as that used for the liquid composition X.

| Ingredients | |
| --- | --- |
| Ethanol (vapor pressure: 44 mmHg/20° C.) | 50 parts |
| Distilled water | 50 parts |

(Manufacture of a Liquid Composition Z)

Other than that the following ingredients were used, a liquid composition Z was obtained using the same manufacturing method as that used for the liquid composition X.

| Ingredients | |
| --- | --- |
| Isopropyl alcohol (vapor pressure: 32 mmHg/20° C.) | 50 parts |
| Distilled water | 50 parts |

(Manufacture of a Liquid Composition S)

Other than that the following ingredients were used, a liquid composition S was obtained using the same manufacturing method as that used for the liquid composition X.

| Ingredients | |
| --- | --- |
| n-butyl alcohol (vapor pressure: 5 mmHg/20° C.) | 90 parts |
| Distilled water | 10 parts |

(Manufacture of a Liquid Composition T)

Other than that the following ingredients were used, a liquid composition T was obtained using the same manufacturing method as that used for the liquid composition X.

| Ingredients | |
| --- | --- |
| Isopropyl alcohol | 99 parts |
| Distilled water | 1 part |

(Manufacture of a Liquid Composition U)

Other than that the following ingredients were used, a liquid composition U was obtained using the same manufacturing method as that used for the liquid composition X.

| Ingredients | |
| --- | --- |
| Isopropyl alcohol | 40 parts |
| Distilled water | 60 parts |

(Manufacture of Ink A)—Dye—based ink—

The following ingredients were mixed and the mixture solution was filtered under pressure using a membrane filter having a 0.22 μm pore size (Fluoro Porefilter by Sumitomo Electric Industries) to obtain inks BK-A, Y-A, M-A and C-A, which are inks of black, yellow, magenta and cyan, respectively, whose pH is adjusted to nine. The set incorporating these four color inks was deemed ink A.

| <BK-A (black ink)> | |
| --- | --- |
| C.I. Food Black 2 | 10 parts |
| Diethylene glycol | 3 parts |
| Glycerin | 13 parts |
| Triethylene glycol monobutyl ether | 4 parts |
| Surfactant (Olfine E1010, Nisshin Kagaku Kogyo) | 0.2 parts |
| Distilled water | 69.8 parts |

| -continued | |
| --- | --- |
| <Y-A (yellow ink)> | |
| C.I. Direct Yellow 86 | 5 parts |
| Diethylene glycol | 3 parts |
| Glycerin | 13 parts |
| Triethylene glycol monobutyl ether | 4 parts |
| Surfactant (Olfine E1010, Nisshin Kagaku Kogyo) | 0.2 parts |
| Distilled water | 74.8 parts |
| <M-A (magenta ink)> | |
| C.I. Acid Red 289 | 5 parts |
| Diethylene glycol | 3 parts |
| Glycerin | 13 parts |
| Triethylene glycol monobutyl ether | 4 parts |
| Surfactant (Olfine E1010, Nisshin Kagaku Kogyo) | 0.2 parts |
| Distilled water | 74.8 parts |
| <C-A (cyan ink)> | |
| C.I. Direct Blue 86 | 6 parts |
| Diethylene glycol | 3 parts |
| Glycerin | 13 parts |
| Triethylene glycol monobutyl ether | 4 parts |
| Surfactant (Olfine E1010, Nisshin Kagaku Kogyo) | 0.2 parts |
| Distilled water | 73.8 parts |

(Manufacture of Ink B)—Dye—based ink—

Inks BK-B, Y-B, M-B and C-B were prepared using the same manufacturing method as that used for the ink A, except that the following dyes were used, and the set of the four color inks was deemed ink B.

<Dye for BK-B (black ink)>

BAYSCRIPT BK SP Liq. (Bayer)

<Dye for Y-B (yellow ink)>

C.I. Acid Yellow 79

<Dye for M-B (magenta ink)>

C.I. Reactive Red 120

<Dye for C-B (cyan ink)>

C.I. Direct Blue 199

(Manufacture of Ink C)—Pigment—based ink—

<BK-C (black ink)>

| Styrene-acrylic acid-ethyl acrylate copolymer | 1.5 parts |
| --- | --- |
| (Acid number 140, average molecular weight 5,000) | |
| Monoethanol amine | 1.0 part |
| Diethylene glycol | 5.0 parts |
| Distilled water | 71.5 parts |

The ingredients listed above were mixed and the mixture solution was heated in a water bath to 70° C. in order to completely dissolve the ingredients. 20 parts of carbon black (REGAL 250R by Cabot) and one part of isopropyl alcohol were added to the mixture solution, and after pre-mixing for half an hour, the carbon black was dispersed under the following conditions.

Dispersion device: Sand Grinder (by Igarashi Kikai)

Crushing medium: zirconium beads φ1 m/m

Crushing medium fill rate: 50% (by volume)

Crushing duration: Three hours

The mixture solution was further centrifuged (12,000 rpm, 20 minutes) to remove large particles, whereupon a dispersion solution was obtained.

The following ingredients were then added to the dispersion solution in the following percentages to prepare a pigment-based ink. This ink was deemed black ink BK-C.

| | |
|---|---|
| Dispersion solution | 50 parts |
| Glycerin | 12 parts |
| Diethylene glycol | 3 parts |
| N-methyl pyrolidone | 5 parts |
| Ethanol | 2 parts |
| Distilled water | 28 parts |

<Y-C (Yellow Ink)>

Yellow ink Y-C was obtained by using the same manufacturing method as that used for the black ink BK-C, except that the carbon black was replaced by the identical amount of pigment yellow 180.

<M-C (Magenta Ink)>

Magenta ink M-C was obtained by means of the same manufacturing method as that used for the black ink BK-C, except that the carbon black was replaced by the identical amount of pigment red 7.

<C-C (Cyan Ink)>

Cyan ink C-C was obtained by using the same manufacturing method as that used for the black ink BK-C, except that the carbon black was replaced by the identical amount of pigment blue 15.

COMPARATIVE EXAMPLE 1

An ink set was formed using the liquid composition X and the ink A, and printing was performed on PPC paper (manufactured specifically for Minolta by Daishowa Paper Mfg. Co, Ltd.) at room temperature and under regular pressure. For the inkjet recording device, a BJC-700J printer (by Canon) equipped with a two-dot printing mechanism was used. When printing was performed, the ink A was made to adhere to the recording paper first, immediately followed by the liquid composition X. For the driving conditions, the standard BJC-700J conditions were used, except that the order of expulsion of the liquid composition and the ink was changed. Ordinarily, the BJC-700J expels the liquid composition first and then the ink.

COMPARATIVE EXAMPLE 2

Printing was performed in the same manner as in the Comparative Example 1 except that the liquid composition X was expelled first, followed by the ink A.

EXAMPLE 1

Printing was performed in the same manner as in the Comparative Example 1, except that the liquid composition Y and the ink A were used.

EXAMPLE 2

Printing was performed in the same manner as in the Example 1, except that the liquid composition Y was expelled first, followed by the ink A.

EXAMPLE 3

Printing was performed in the same manner as in the Comparative Example 1, except that the liquid composition Z and the ink A were used.

EXAMPLE 4

Printing was performed in the same manner as in the Example 3, except that the liquid composition Z was expelled first, followed by the ink A.

EXAMPLE 5

Printing was performed in the same manner as in the Comparative Example 1, except that the liquid composition Y and the ink B were used.

COMPARATIVE EXAMPLE 3

Printing was performed in the same manner as in the Comparative Example 1, except that the liquid composition X and the ink C were used.

COMPARATIVE EXAMPLE 4

Printing was performed in the same manner as in the Comparative Example 3, except that the liquid composition X was expelled first, followed by the ink C.

EXAMPLE 6

Printing was performed in the same manner as in the Comparative Example 1, except that the liquid composition Y and the ink C were used.

EXAMPLE 7

Printing was performed in the same manner as in the Example 6, except that the liquid composition Y was expelled first, followed by the ink C.

EXAMPLE 8

Printing was performed in the same manner as in the Comparative Example 1, except that the liquid composition Z and the ink C were used.

EXAMPLE 9

Printing was performed in the same manner as in the Example 8, except that the liquid composition Z was expelled first, followed by the ink C.

CAMPARATIVE EXAMPLE 5

Printing was performed in the same manner as in the Comparative Example 1, except that the liquid composition T and the ink A were used.

COMPARATIVE EXAMPLE 6

Printing was performed in the same manner as in the Comparative Example 1, except that the liquid composition S and the ink A were used.

COMPARATIVE EXAMPLE 7

Printing was performed in the same manner as in the Comparative Example 1, except that the liquid composition U and the ink A were used.

COMPARATIVE EXAMPLE 8

Printing was performed in the same manner as in the Comparative Example 1, except that no liquid composition was used and only the ink A was used.

EVALUATION

Drying Property

After forming a solid red image using the liquid composition and the yellow and magenta inks in each embodiment and comparison example, another sheet of blank paper was placed over the recorded image using the paper's own weight. The period of time until the recorded image was no longer transferred onto the overlapped paper and the paper was no longer smeared was measured, assuming that the time at which the recording was finished to be zero, and the measurement was used to check the drying property. The criteria for the evaluation were as shown below.

⊚: Dries in less than three seconds.
○: Dries in three seconds or more but in less than six seconds.
Δ: Dries in six seconds or more but in less than ten seconds.
×: Dries in ten seconds or more.

Clogging of the Ink Nozzles

Using the liquid composition and the yellow, magenta, cyan and black inks in each embodiment and comparison example, printing was performed continuously on 100 sheets of paper, and the clogging of the nozzles was evaluated. A "○" indicates that printing took place favorably up to the very last sheet and no clogging occurred, while a "×" means that clogging occurred before printing of the last sheet and printing became impossible.

Storability of the Liquid Compositions in the Nozzles

The initial weight of the liquid composition cartridge was measured. The cartridge was then mounted in the apparatus and left to remain there at room temperature and humidity. The weight of the cartridge was measured again after one month to determine the weight of the liquid composition in accordance with the difference in evaporation speed.

⊚: Little change in weight
○: A little change
Δ: Substantial change
×: Large change The area on which the liquid composition was made to adhere on the recording medium during the evaluation was the same as the image formation area for the ink. The printing duty was 100% for both the liquid composition and the ink. Further, the printing was performed in one direction only.

The results of the evaluation are shown in Tables 1 and 2 for each liquid composition and ink as well as according to the order of expulsion in each embodiment and comparison example.

TABLE 1

|  | Ink | Liquid composition | Precedence of liquid composition or ink |
|---|---|---|---|
| Comparative Example 1 | A | X | Ink precedes |
| Comparative Example 2 | A | X | Liquid composition precedes |
| Example 1 | A | Y | Ink precedes |
| Example 2 | A | Y | Liquid composition precedes |
| Example 3 | A | Z | Ink precedes |
| Example 4 | A | Z | Liquid composition precedes |
| Example 5 | B | Y | Ink precedes |
| Comparative Example 3 | C | X | Ink precedes |
| Comparative Example 4 | C | X | Liquid composition precedes |
| Example 6 | C | Y | Ink precedes |
| Example 7 | C | Y | Liquid composition precedes |
| Example 8 | C | Z | Ink precedes |
| Example 9 | C | Z | Liquid composition precedes |
| Comparative Example 5 | A | T | Ink precedes |
| Comparative Example 6 | A | S | Ink precedes |
| Comparative Example 7 | A | U | Ink precedes |
| Comparative Example 8 | A | — | Ink alone |

TABLE 2

|  | Drying property | Clogging of ink nozzles | Storability of liquid composition |
|---|---|---|---|
| Comparative Example 1 | ⊚ | ○ | X |
| Comparative Example 2 | ○ | ○ | X |
| Example 1 | ○ | ○ | ○ |
| Example 2 | Δ | ○ | ○ |
| Example 3 | ○ | ○ | ⊚ |
| Example 4 | ○ | ○ | ⊚ |
| Example 5 | ○ | ○ | ○ |
| Comparative Example 3 | ⊚ | ○ | X |
| Comparative Example 4 | ○ | ○ | X |
| Example 6 | ○ | ○ | ○ |
| Example 7 | Δ | ○ | ○ |
| Example 8 | ○ | ○ | ⊚ |
| Example 9 | ○ | ○ | ⊚ |
| Comparative Example 5 | ⊚ | ○ | X |
| Comparative Example 6 | X | ○ | ○ |
| Comparative Example 7 | X | ○ | ○ |
| Comparative Example 8 | X | ○ | — |

The prescribed level of darkness was not obtained in the comparison examples 6 and 7.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A liquid composition for an image forming method comprising the steps of attaching the liquid composition to a recording medium and applying an ink to the recording medium in an ink jet process, the liquid composition consisting of an organic solvent and water, the organic solvent having a vapor pressure of 30 to 60 mmHg at 20° C., wherein the weight ratio of the organic solvent to the water is between 95:5 to 45:55.

2. The liquid composition according to claim 1, wherein the organic solvent is a lower alcohol.

3. An ink set comprising:
   a liquid composition consisting of an organic solvent and water, the organic solvent having a vapor pressure of 30 to 60 mmHg at 20° C., the weight ratio of the organic solvent to the water being between 95:5 to 45:55; and
   at least one ink selected from the group consisting of yellow ink, magenta ink, cyan ink, black ink, red ink, blue ink and green ink.

4. The ink set according to claim 3, comprising the liquid composition, yellow ink, magenta ink and cyan ink.

5. The ink set according to claim 3, comprising the liquid composition, yellow ink, magenta ink, cyan ink and black ink.

6. The ink set according to claim 3, wherein the ink comprises 5 to 10% by weight of a coloring agent and water.

7. The ink set according to claim 6, wherein the coloring agent is a dye.

8. The ink set according to claim 6, wherein the coloring agent is a pigment.

9. The ink set according to claim 8, wherein the ink comprises the pigment, a water-soluble resin and water.

10. The ink set according to claim 9, wherein the water-soluble resin has an average molecular weight of 1,000 to 30,000.

11. The ink set according to claim 8, wherein the pigment is carbon black having an average primary particle size of 15 to 40 nm.

12. The ink set according to claim 8, wherein the pigment is carbon black having a BET surface area of 50 to 300 m²/g.

13. The ink set according to claim 3, wherein the organic solvent is a lower alcohol.

14. An image forming method comprising the steps of:
attaching a liquid composition to at least an image forming area of a recording medium, said liquid composition consisting of an organic solvent and water, the organic solvent having a vapor pressure of 30 to 60 mmHg at 20° C., the weight ratio of the organic solvent to the water being between 95:5 to 45:55; and applying an ink to the recording medium by an ink jet process.

15. The image forming method according to claim 14, wherein the liquid composition is attached to the recording medium by an ink jet process.

16. The image forming method according to claim 14, wherein the liquid composition attaching step precedes the ink applying step.

17. The image forming method according to claim 14, wherein the ink applying step precedes the liquid composition attaching step.

18. The image forming method according to claim 14, wherein the ink is selected from the group consisting of yellow ink, magenta ink, cyan ink, black ink, red ink, blue ink and green ink.

19. A liquid composition for an image forming method comprising the steps of attaching the liquid composition to a recording medium and applying an ink to the recording medium in an ink jet process, the liquid composition consisting of an organic solvent, water and additive selected the group consisting of viscosity adjusting agent, pH adjusting agent, preservative, surfactant, antioxidant and evaporation promoting agent, the organic solvent having a vapor pressure of 30 to 60 mmHg at 20° C., wherein the weight ratio of the organic solvent to the water is between 95:5 to 45:55.

20. An ink set comprising:
a liquid composition consisting of an organic solvent, water and additive selected the group consisting of viscosity adjusting agent, pH adjusting agent, preservative, surfactant, antioxidant and evaporation promoting agent, the organic solvent having a vapor pressure of 30 to 60 mmHg at 20° C., the weight ratio of the organic solvent to the water being between 95:5 to 45:55; and at least one ink selected from the group consisting of yellow ink, magenta ink, cyan ink, black ink, red ink, blue ink and green ink.

* * * * *